US012564850B2

(12) United States Patent
Xiao

(10) Patent No.: US 12,564,850 B2
(45) Date of Patent: Mar. 3, 2026

(54) RESERVOIR SEAL COVER, RESERVOIR CONNECTION MECHANISM FOR SPRAY GUN, AND RESERVOIR

(71) Applicant: QINGDAO HANBO PLASTIC TECHNOLOGY CO., LTD., Qingdao (CN)

(72) Inventor: Yun Xiao, Qingdao (CN)

(73) Assignee: QINGDAO HANBO PLASTIC TECHNOLOGY CO., LTD., Qingdao (CN)

( * ) Notice: Subject to any disclaimer, the term of this patent is extended or adjusted under 35 U.S.C. 154(b) by 154 days.

(21) Appl. No.: 18/555,422

(22) PCT Filed: Mar. 23, 2022

(86) PCT No.: PCT/CN2022/082617

§ 371 (c)(1),
(2) Date: Oct. 13, 2023

(87) PCT Pub. No.: WO2022/218119

PCT Pub. Date: Oct. 20, 2022

(65) Prior Publication Data

US 2024/0199292 A1 Jun. 20, 2024

(30) Foreign Application Priority Data

Apr. 14, 2021 (CN) ......................... 202120757691.5

(51) Int. Cl.
*B05B 7/24* (2006.01)
*B65D 43/02* (2006.01)
(Continued)

(52) U.S. Cl.
CPC ............ *B05B 7/2408* (2013.01); *B65D 43/02* (2013.01); *B65D 53/02* (2013.01); *B65D 55/06* (2013.01)

(58) Field of Classification Search
CPC ...... B05B 7/2408; B65D 41/04; B65D 43/02; B65D 47/06; B65D 53/02; B65D 55/06
(Continued)

(56) References Cited

U.S. PATENT DOCUMENTS

2004/0140373 A1 7/2004 Joseph et al.
2008/0179763 A1* 7/2008 Schmon ................ B05B 7/2408 30/366
2016/0243574 A1 8/2016 Bierie et al.

FOREIGN PATENT DOCUMENTS

CN 108472668 A 8/2018
CN 108472669 A 8/2018
(Continued)

OTHER PUBLICATIONS

International Search Report issued on Jul. 15, 2022, in corresponding International Patent Application No. PCT/CN2022/082617, 9 pages.

*Primary Examiner* — Nathan J Jenness
*Assistant Examiner* — Madison L Poos
(74) *Attorney, Agent, or Firm* — Maier & Maier, PLLC

(57) ABSTRACT

A reservoir seal cover, a reservoir connection mechanism for a spray gun, and a reservoir. The reservoir seal cover includes a seal cover body and a spray opening formed on the seal cover body, on a side wall of the spray opening two lockout protrusions are formed, two ends of an upper edge of the lockout protrusion extend upwards to form a stopping bump, a top surface of the stopping bump is a plane, and four top surfaces of four stopping bumps formed by the two lockout protrusions are arranged on one same horizontal plane. The preset reservoir seal cover extends two ends of the upper edge of the lockout protrusion used for lockout upwards to form the stopping bump, thereby increasing the elastic modulus of the lockout protrusion and increasing the number of uses.

7 Claims, 6 Drawing Sheets

(51) Int. Cl.
*B65D 53/02* (2006.01)
*B65D 55/06* (2006.01)

(58) Field of Classification Search
USPC .......................................... 220/324; 215/331
See application file for complete search history.

(56) References Cited

FOREIGN PATENT DOCUMENTS

| | | | | | |
|---|---|---|---|---|---|
| CN | 109789429 | A | | 5/2019 | |
| CN | 210252849 | U | * | 4/2020 | ......... B05B 11/0005 |
| CN | 214567471 | U | | 11/2021 | |
| ES | 2862728 | T3 | * | 10/2021 | ......... B05B 11/0037 |

* cited by examiner

RESERVOIR SEAL COVER, RESERVOIR CONNECTION MECHANISM FOR SPRAY GUN, AND RESERVOIR

FIELD

The present disclosure relates to the technical field of paint-spraying devices, in particular to a reservoir seal cover, a reservoir connection mechanism for spray gun, and a reservoir.

BACKGROUND

Reservoir seal cover for spray gun is used to be connected to the spray gun, or to be connected to the spray gun after the reservoir seal cover is connected to a nut (or called an adapter). The spray gun or the nut is made of stainless steel. An upper edge of traditional reservoir seal cover is a plane. When the traditional reservoir seal cover is connected to the spray gun or the nut, it will cause irreversible damage to a lockout mechanism, and the traditional reservoir seal cover can only be used once.

SUMMARY

According to the shortcomings in the prior art, the present disclosure provides a new reservoir seal cover, reservoir connection mechanism for spray gun, and reservoir.

A reservoir seal cover comprises a seal cover body and a spray opening formed on the seal cover body, on a side wall of the spray opening two lockout protrusions are formed, two ends of an upper edge of the lockout protrusion extend upwards to form a stopping bump, a top surface of the stopping bump is a plane, and four top surfaces of four stopping bumps formed by the two lockout protrusions are arranged on one same horizontal plane.

In some embodiments, a lower edge of the lockout protrusion is inclined as a whole.

In some embodiments, the lower edge of the lockout protrusion is an inclined plane.

In some embodiments, the lower edge of the lockout protrusion is arranged with a plurality of protrusions.

In some embodiments, the lockout protrusion is integrated with the cover by injection molding.

A reservoir connection mechanism for a spray gun, comprises the reservoir seal cover mentioned above and a nut, the nut comprises a nut body, a connecting end between the nut body and the reservoir seal cover is arranged with a locking protrusion and a locking surface, a locking slot is arranged between the locking protrusion and the locking surface to accommodate the lockout protrusion.

A reservoir, comprises the reservoir seal cover mentioned above and a reservoir cup, and the reservoir seal cover and the reservoir cup are detachably connected together.

Beneficial effects of the present disclosure:

the reservoir seal cover of the present disclosure extends two ends of the upper edge of the lockout protrusion used for lockout upwards to form the stopping bump, thereby increasing the elastic modulus of the lockout protrusion and increasing the number of uses.

DETAILED DESCRIPTION OF EMBODIMENTS

The terms used in the present disclosure generally have meanings that those ordinary skilled in the art can commonly understand, unless otherwise noted.

Following is a detailed description of the present disclosure based on following embodiments and datas. The following embodiments are only for illustrating the present disclosure as examples, instead of limiting the scope of the present disclosure in any way.

A reservoir seal cover, as shown in FIGS. 1-5, comprises a seal cover body 1 and a spray opening 2 formed on the seal cover body 1. Two lockout protrusions 3 are formed on a side wall of the spray opening 2, and two ends of an upper edge of the lockout protrusion 3 extend upwards to form a stopping bump 3-1. A top surface 3-2 of the stopping bump 3-1 is a plane, and four top surfaces of four stopping bumps 3-1 formed by the two lockout protrusions 3 are arranged on one same horizontal plane.

Figure 8:
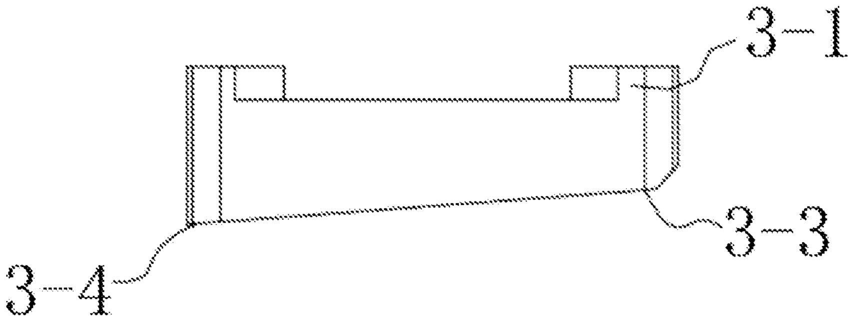
FIG. 8 is a schematic diagram of a structure of one lockout protrusion of a reservoir seal cover in the present disclosure.
Figure 9:
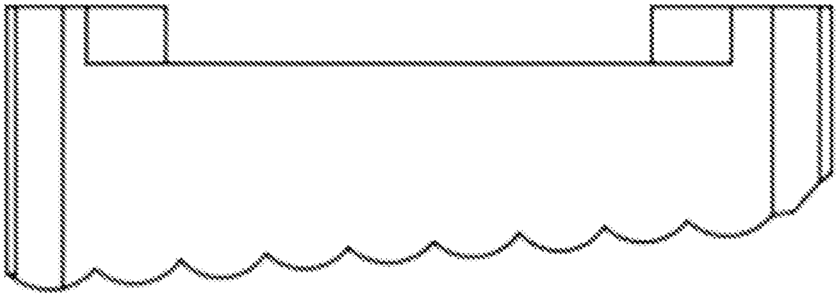
FIG. 9 is a schematic diagram of a structure of another lockout protrusion of a reservoir seal cover in the present disclosure.

In some embodiments, a lower edge of the lockout protrusion 3 is inclined as a whole, allowing the reservoir seal cover to be being locked continuously when the reservoir seal cover is used in cooperation with the nut. In some embodiments, as shown in FIG. 8, the lower edge of the lockout protrusion 3 is an inclined plane. In some embodiments, as shown in FIG. 9, the lower edge of the lockout protrusion 3 is arranged with a plurality of protrusions.

In some embodiments, the lockout protrusion 3 is integrated with the cover by injection molding.

Figure 1:
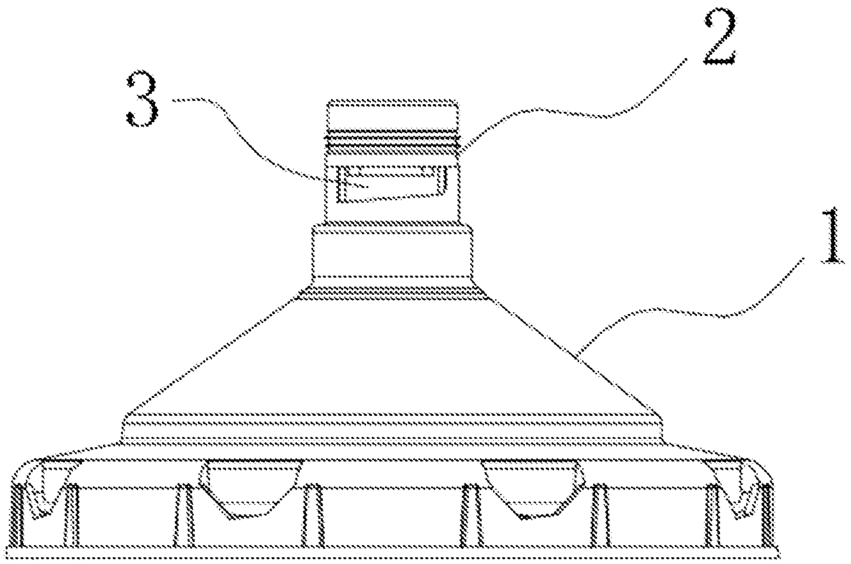
FIG. 1 is a schematic diagram of a front view of a reservoir seal cover in the present disclosure.
Figure 2:
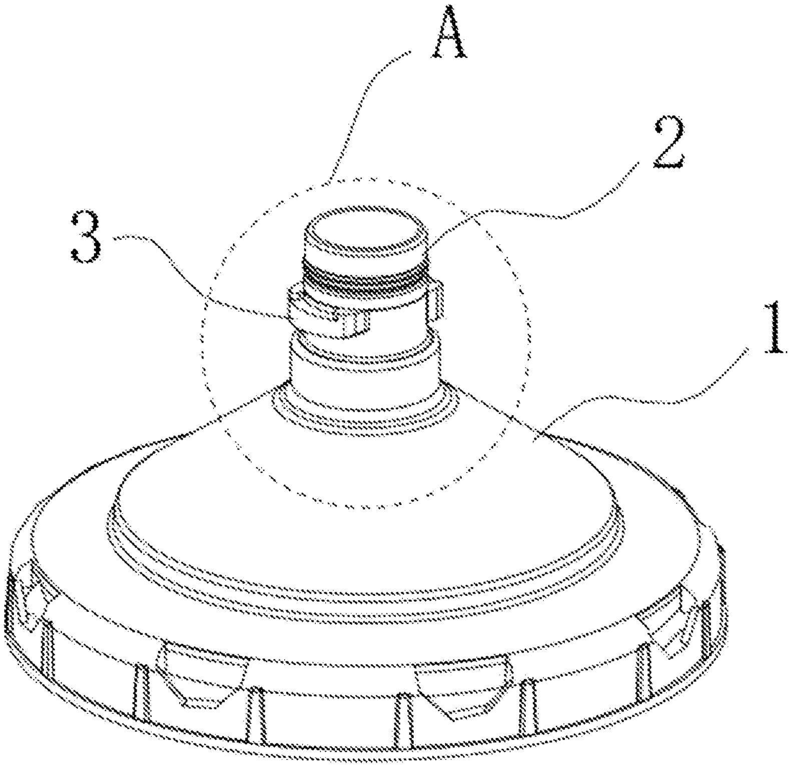
FIG. 2 is a schematic diagram of a perspective view of a reservoir seal cover in the present disclosure.
Figure 3:
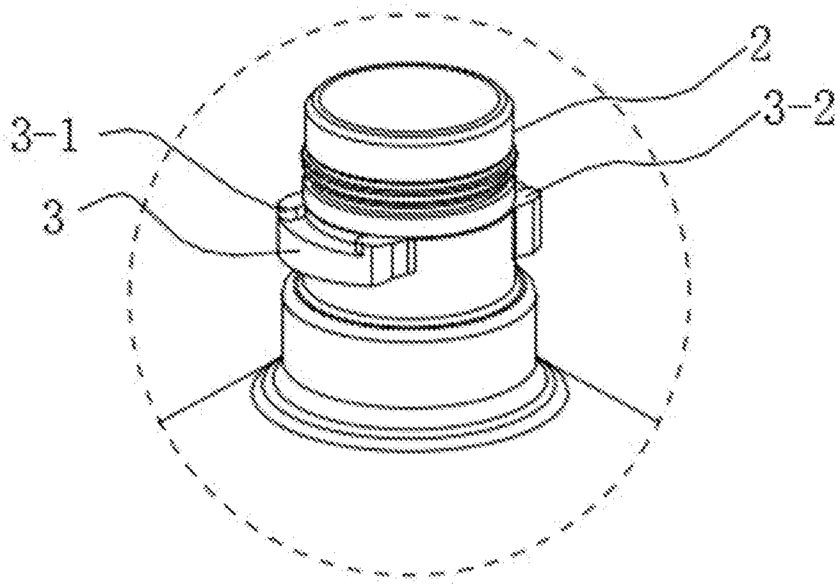
FIG. 3 is a schematic diagram of an enlarged structure of A portion in FIG. 2.
Figure 4:
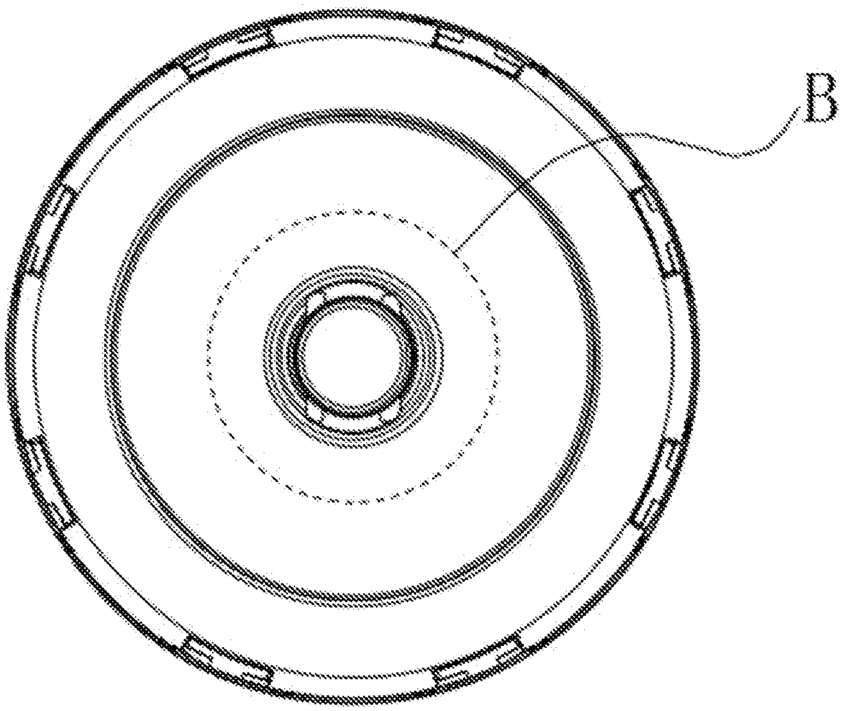
FIG. 4 is a schematic diagram of a top view of a reservoir seal cover in the present disclosure.
Figure 5:
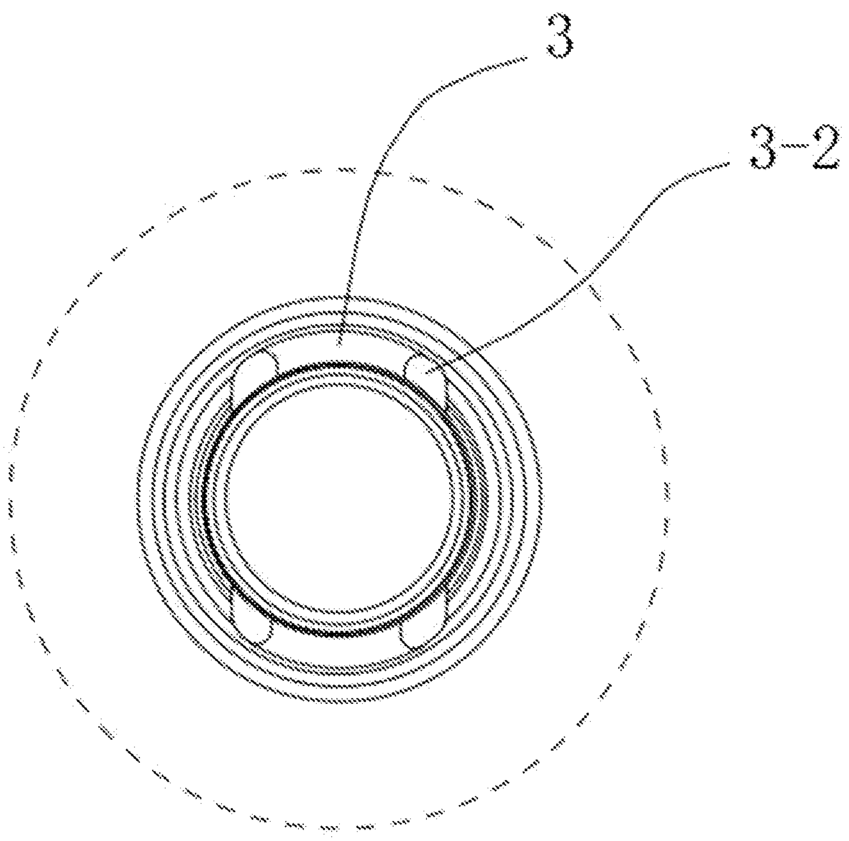
FIG. 5 is a schematic diagram of an enlarged structure of B portion in FIG. 4.
Figure 6:
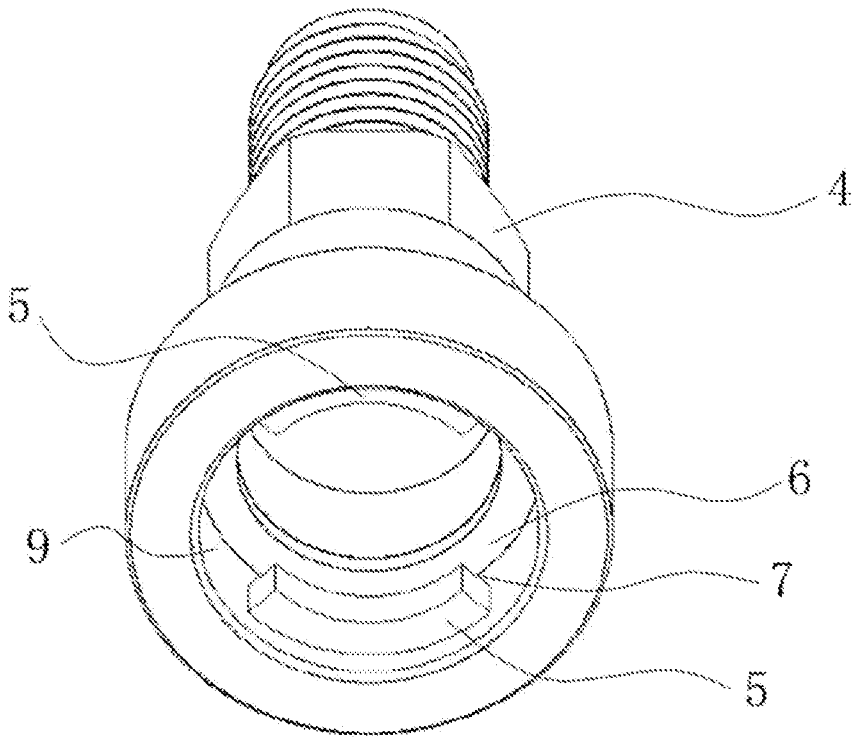
FIG. 6 is a schematic diagram of a structure of a nut in the present disclosure.

A reservoir connection mechanism for a spray gun, comprises the reservoir seal cover mentioned above and a nut, as shown in FIG. 6, wherein the nut comprises a nut body 4. A connecting end between the nut body 4 and the reservoir seal cover is arranged with a locking protrusion 5 and a locking surface 6. A locking slot 7 is arranged between the locking protrusion 5 and the locking surface 6 to accommodate the lockout protrusion 3. Two locking protrusion 5 are arranged to be used in cooperation with the two lockout protrusions 3 respectively. A penetration part 9 is arranged between the two locking protrusions 5, and is configured for passing through the lockout protrusion 3. The nut is configured to be connected to a spray gun, thereby connecting the reservoir and the spray gun together.

When in use, the spray opening of a reservoir seal cover is inserted into a lower part of a nut body 4. In some embodiments, two lockout protrusions 3 pass through a penetration part 9 of a nut respectively. Then the reservoir seal cover is rotated in a direction of rising along a lower edge of the lockout protrusion 3, as shown in FIG. 8, the rotating direction for locking is rotating the cover toward a head end 3-3 of the lockout protrusion 3, to make the lockout protrusion 3 screwed into the locking slot 7, wherein the locking slot 7 is arranged between the locking protrusion 5 and the locking surface 6 of the nut, and is configured to accommodate the lockout protrusion 3. As a screw in depth is deeper, the lockout protrusion 3 is engaged with an upper edge of the locking protrusion 5 continuously: at the same time, four top surfaces 3-2 of two stopping bumps 3-1 of the lockout protrusions 3 contact on the locking surface 6 of the nut simultaneously, so that the locking protrusion 3 is engaged in the locking slot 7 of the nut. As the screw in depth is deeper, the lockout protrusion 3 is tightly engaged in the locking slot 7 of the nut. Continuing to rotate, the stopping bump 3-1 is squeezed and constantly deformed, and finally a tail end 3-4 of the lockout protrusion 3 is detached from the locking protrusion 5. When in use, users control the screw in depth to lock the reservoir seal cover and the nut together. For a first use, the screw in depth is controlled to lock the reservoir seal cover and the nut together: for a non-first use, only the screw in depth is greater than the previous screw in depth to lock the reservoir seal cover and the nut together. As long as the tail end 3-4 of the lockout protrusion 3 is not detached from the locking protrusion 5, the cover can be used again, thereby ensuring multiple uses of the cover.

Figure 7:
FIG. 7 is a schematic diagram of a structure of a reservoir in the present disclosure.

A reservoir, as shown in FIG. 7, comprises the reservoir seal cover mentioned above and a reservoir cup 8. The reservoir seal cover and the reservoir cup 8 may be detachably connected together, wherein a connection method may be a threaded connection or a snap-fitted connection.

These above are only preferred embodiments of the present disclosure, and are not limitations on other forms of the present disclosure. Any ordinary skilled in the art may utilize the disclosed technical contents to make changes or modifications to obtain equivalent embodiments, however, any simple modifications and equivalent changes or modifications, that are made to the above embodiments based on the technical essence of the present disclosure and are not separated from the technical solutions of the present disclosure, still fall within the protection scope of the technical solutions of the present disclosure.

What is claimed is:

1. A reservoir seal cover, comprising: a seal cover body and a spray opening formed on the seal cover body, and on a side wall of the spray opening two lockout protrusions are formed, wherein two ends of an upper edge of each lockout protrusion extend upwards to form a stopping bump, a top surface of the stopping bump is a plane, and four top surfaces of four stopping bumps formed by the two lockout protrusions are arranged on one same horizontal plane, wherein each stopping bump is configured to deform elastically during locking engagement, and to control a locking depth between the reservoir seal cover and a mating nut.

2. The reservoir seal cover according to claim 1, wherein a lower edge of each lockout protrusion is inclined as a whole.

3. The reservoir seal cover according to claim 2, wherein the lower edge of each lockout protrusion is an inclined plane.

4. The reservoir seal cover according to claim 2, wherein the lower edge of each lockout protrusion is arranged with a plurality of protrusions.

5. The reservoir seal cover according to claim 1, wherein each lockout protrusion is integrated with the cover by injection molding.

6. A reservoir connection mechanism for a spray gun, the reservoir connection mechanism comprising the reservoir seal cover according to claim 1 and a nut, the nut comprises a nut body, a connecting end between the nut body and the reservoir seal cover is arranged with two locking protrusions and a locking surface, a locking slot is arranged between the two locking protrusions and the locking surface to accommodate the two lockout protrusions, the two locking protrusions are arranged to be used in cooperation with the two lockout protrusions respectively, a penetration part is arranged between the two locking protrusions and is configured for passing through the two lockout protrusions.

7. A reservoir, wherein the reservoir comprises the reservoir seal cover according to claim 1 and a reservoir cup, and the reservoir seal cover and the reservoir cup are detachably connected together.

* * * * *